US009154010B2

(12) United States Patent
Yokogawa

(10) Patent No.: US 9,154,010 B2
(45) Date of Patent: Oct. 6, 2015

(54) ARMATURE AND MOTOR INCLUDING ARMATURE

(75) Inventor: Tomoyoshi Yokogawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 232 days.

(21) Appl. No.: 13/883,824

(22) PCT Filed: Dec. 17, 2011

(86) PCT No.: PCT/JP2011/007058
§ 371 (c)(1),
(2), (4) Date: May 7, 2013

(87) PCT Pub. No.: WO2012/090424
PCT Pub. Date: Jul. 5, 2012

(65) Prior Publication Data
US 2013/0221770 A1   Aug. 29, 2013

(30) Foreign Application Priority Data
Dec. 29, 2010  (JP) .................................. 2010-294396

(51) Int. Cl.
H02K 3/34 (2006.01)
H02K 1/14 (2006.01)
H02K 3/52 (2006.01)
H02K 3/32 (2006.01)

(52) U.S. Cl.
CPC ................ *H02K 3/345* (2013.01); *H02K 1/148* (2013.01); *H02K 3/522* (2013.01); *H02K 3/325* (2013.01)

(58) Field of Classification Search
USPC ........................................................ 310/215
See application file for complete search history.

(56) References Cited

U.S. PATENT DOCUMENTS

| | | | |
|---|---|---|---|
| 7,663,287 B2* | 2/2010 | Haga et al. | 310/260 |
| 2004/0245882 A1 | 12/2004 | Horie et al. | |
| 2005/0218744 A1 | 10/2005 | Nakanishi et al. | |
| 2007/0194653 A1* | 8/2007 | Prokscha et al. | 310/218 |
| 2009/0127969 A1* | 5/2009 | Okuyama et al. | 310/215 |
| 2013/0193800 A1* | 8/2013 | Yokogawa | 310/215 |

FOREIGN PATENT DOCUMENTS

| | | |
|---|---|---|
| JP | 2002-084696 A | 3/2002 |
| JP | 2003-079080 A | 3/2003 |
| JP | 2004-140964 A | 5/2004 |
| JP | 2005-229703 A | 8/2005 |
| JP | 2006-042574 A | 2/2006 |

OTHER PUBLICATIONS

Official Communication issued in International Patent Application No. PCT/JP2011/007058, mailed on Jan. 17, 2012.

* cited by examiner

*Primary Examiner* — Hanh Nguyen
(74) *Attorney, Agent, or Firm* — Keating & Bennett, LLP

(57) ABSTRACT

An armature includes an insulator mounted on a tooth portion around which a conducting wire is wound. A pair of a first member and a second member, which are combined so as to abut each other, is provided. The first member includes a first end wall which covers an upper side end in the axial direction of the tooth portion and a pair of first side walls which partially cover both side portions of the tooth portion. A first overlap portion is provided on a tip portion of the first side wall. A plurality of ribs extending so as to be parallel or substantially parallel to the winding direction of the conducting wire is disposed on an outer surface of the first overlap portion.

19 Claims, 15 Drawing Sheets

ARMATURE AND MOTOR INCLUDING ARMATURE

BACKGROUND OF THE INVENTION

1. Field of the Invention

The present invention relates to an armature including an insulator and more specifically to a motor including the armature.

2. Description of the Related Art

In JP-A 2004-140964, an insulator is disclosed in which guide grooves are provided in the side surfaces so that coils are arranged in the guide grooves and wound around the insulator.

Moreover, in JP-A 2003-79080, an insulating member which is constituted so as to fit two insulating member pieces to each other is disclosed. Fitting portions which are fitted so as to overlap each other are installed in the tip of each insulating member piece. The fitting portions secure the minimum thickness size needed for the strength and the insulation performance. Thereby, the portion in which the fitting portions are overlapped with each other is necessarily thick.

As one way for improving motor performance, there is an improvement of a space factor of coils. If the coils are arranged and wound around the insulating member as in JP-A 2004-140964, the space factor of coils can be improved because the coils can be densely wound.

Moreover, if the thickness of the insulator is thin, the space factor of the coils can be improved because the space for accommodating the coils can be increased.

However, in the case of the insulating member like JP-A 2003-79080, in order to make the thickness of the fitting portions be the same as those of the other portions of the insulating member pieces, the fitting portions become thinner than the other portions of the insulating member pieces by the amount of overlap.

In addition, if the thickness of the insulation member pieces is thinned to the utmost limit, the thickness of the fitting portions is further thinned. As a result, in addition to the concern that strength of the fitting portions is decreased, there are also concerns that the fitting portions may be easily deformed such that a constant shape may not be stably held.

As a result, when the pair of insulating member pieces is fitted to magnetic tooth portions, there are concerns that the fitting portions of the pair of insulating member pieces may not be appropriately fitted and may be damaged.

SUMMARY OF THE INVENTION

Preferred embodiments of the present invention provide an armature including an insulator arranged to stably combine a plurality of members even though a thickness of the insulator is thin.

An armature of a preferred embodiment of the present invention includes a tooth portion, an insulator that is mounted on the tooth portion, and a conducting wire that is wound around the tooth portion via the insulator. The insulator includes a first member and a second member which are combined with each other. The first member includes a first end wall that covers an upper side end in the axial direction of a winding portion in which the winding wire is wound around the tooth portion, and a pair of plate-shaped first side walls that extend from the first end wall to the lower side and covers both side portions of the winding portion. At least one of the pair of first side walls includes a first abdominal portion that extends to the first end wall, and a first overlap portion that is positioned closer to the lower side than the first abdominal portion and has a thickness which is thinner than the thickness of the first abdominal portion. The second member includes a second end wall that covers the lower side end of the winding portion in which the winding wire is wound around the tooth portion, and a pair of plate-shaped second side walls that extend from the second end wall to the upper side and covers both side portions of the winding portion. At least one of the pair of second side walls includes a second abdominal portion that extends to the second end wall, and a second overlap portion that is positioned closer to the upper side than the second abdominal portion and has a thickness which is thinner than the thickness of the second abdominal portion. The first overlap portion is disposed farther to the outer side than the second overlap portion in the thickness direction in the first side wall in a state where the first member and the second member are combined with each other. A plurality of ribs extending from the lower side to the upper side in the axial direction of the first overlap portion is disposed at an outer surface in the thickness direction of the first overlap portion.

According to various preferred embodiments of the present invention, the strength of the first overlap portion can be improved. Therefore, the insulator is not easily deformed by shrinkage or the like during molding and can be stably held in a constant shape.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention are explained in detail based on drawings. However, the following explanation is merely exemplary in nature, and preferred embodiments of the present invention, and the applications or the uses thereof are not limited.

Figure 1:
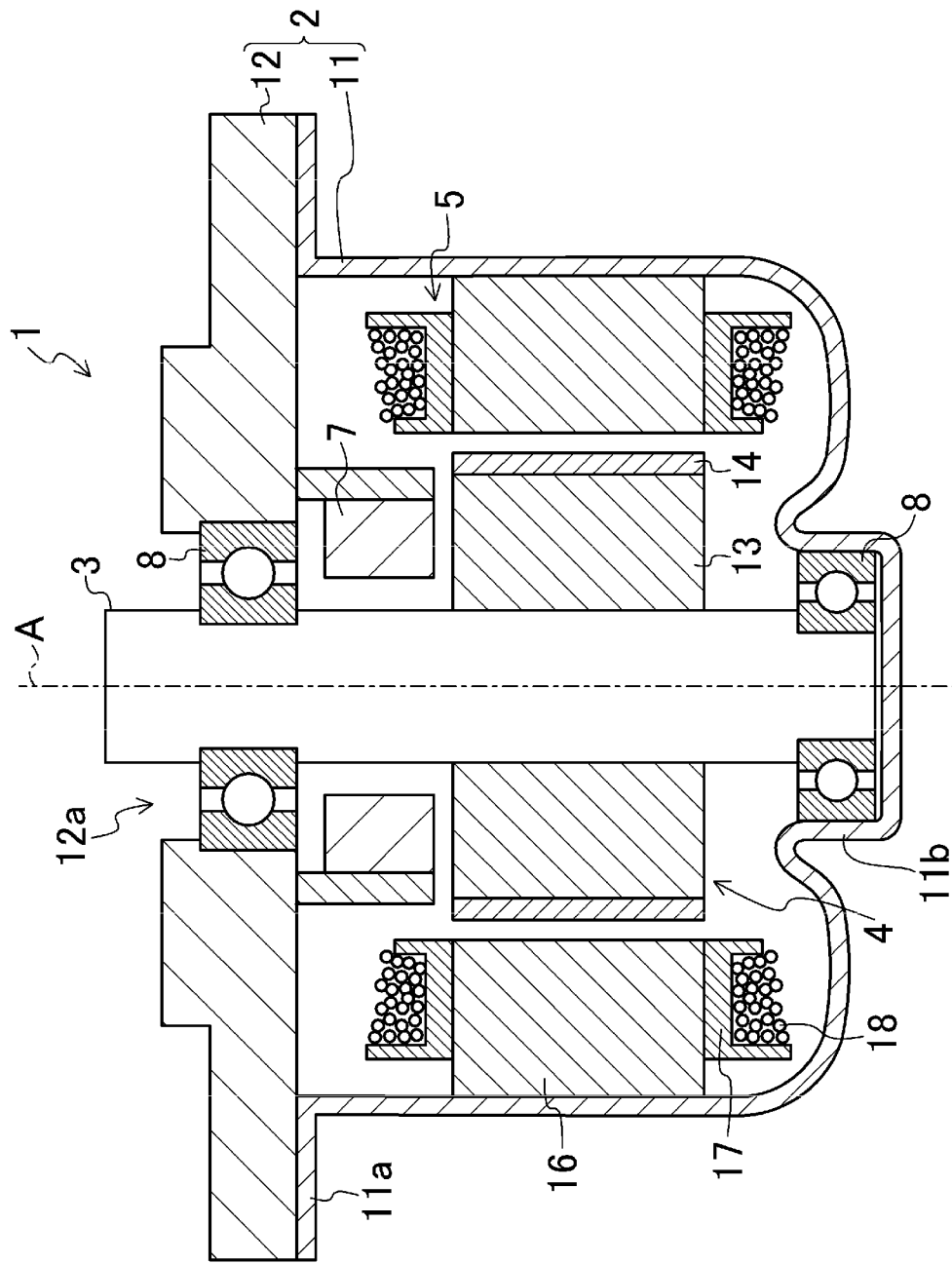
FIG. 1 is a schematic cross-sectional view showing a motor according to a first preferred embodiment of the present invention.

FIG. 1 shows a motor of a first preferred embodiment of the present invention. The motor 1 is preferably an inner rotor type brushless motor. The motor 1 preferably includes a motor case 2, a shaft 3, a rotor 4, and a stator 5. A reference number 7 indicates a rotation sensor which is arranged to detect the rotation of the rotor 4.

The center of the rotor 4 or the stator 5 is disposed so as to substantially coincide with the center A of the shaft 3 (rotating shaft of the motor 1). Moreover, for convenience, when explaining each member or the like, in FIG. 1, the direction in which the rotating shaft A extends is referred to as the axial direction, the direction which is perpendicular or substantially perpendicular to the rotating shaft A is referred to as the radial direction, and the direction around the rotating shaft A is referred to as the circumferential direction.

The motor case 2 preferably includes a cylindrical housing 11 in which one end is opened and which includes a base, and a substantially disk-shaped cover 12. A flange portion 11a is preferably arranged to protrude around this one end of the housing 11. The cover 12 is fixed to the flange portion 11a. A shaft hole 12a is provided at the center portion of the cover 12. A bearing portion 11b is preferably disposed on a base surface of the housing 11. The shaft 3 and the like are disposed in the inner portion of the housing 11 which is covered by the cover 12.

A bearing 8 is disposed at the inside of each of the bearing portion 11b and the shaft hole 12a. The shaft 3 is rotatably supported to the motor case 2 via the bearings 8 and 8. One end of the shaft 3 protrudes to the outside of the cover 12 through the shaft hole 12a. A rotational driving force of the motor 1 is output through this one end.

The rotor 4 is fixed to the intermediate portion of the shaft 3. The rotor 4 preferably includes a cylindrical rotor core 13, a magnet 14, or the like. The magnet 14 is disposed on the outer circumference of the rotor core 13. Magnetic poles of the magnet 14 are disposed so that N poles and S poles are alternately arranged in the circumferential direction.

The stator 5 having a cylindrical or substantially cylindrical shape is disposed around the rotor 4. The stator 5 is fixed to the inside of the housing 11. The inner circumferential surface of the stator 5 faces the outer circumferential surface of the rotor 4 so as to be separated with a slight gap. In the stator 5, a plurality of split stators 15 are connected to one another and arranged in a cylindrical or substantially cylindrical shape. The split stators 15 preferably include split cores 16, the insulators 17, a coil 18, and the like.

Figure 2:
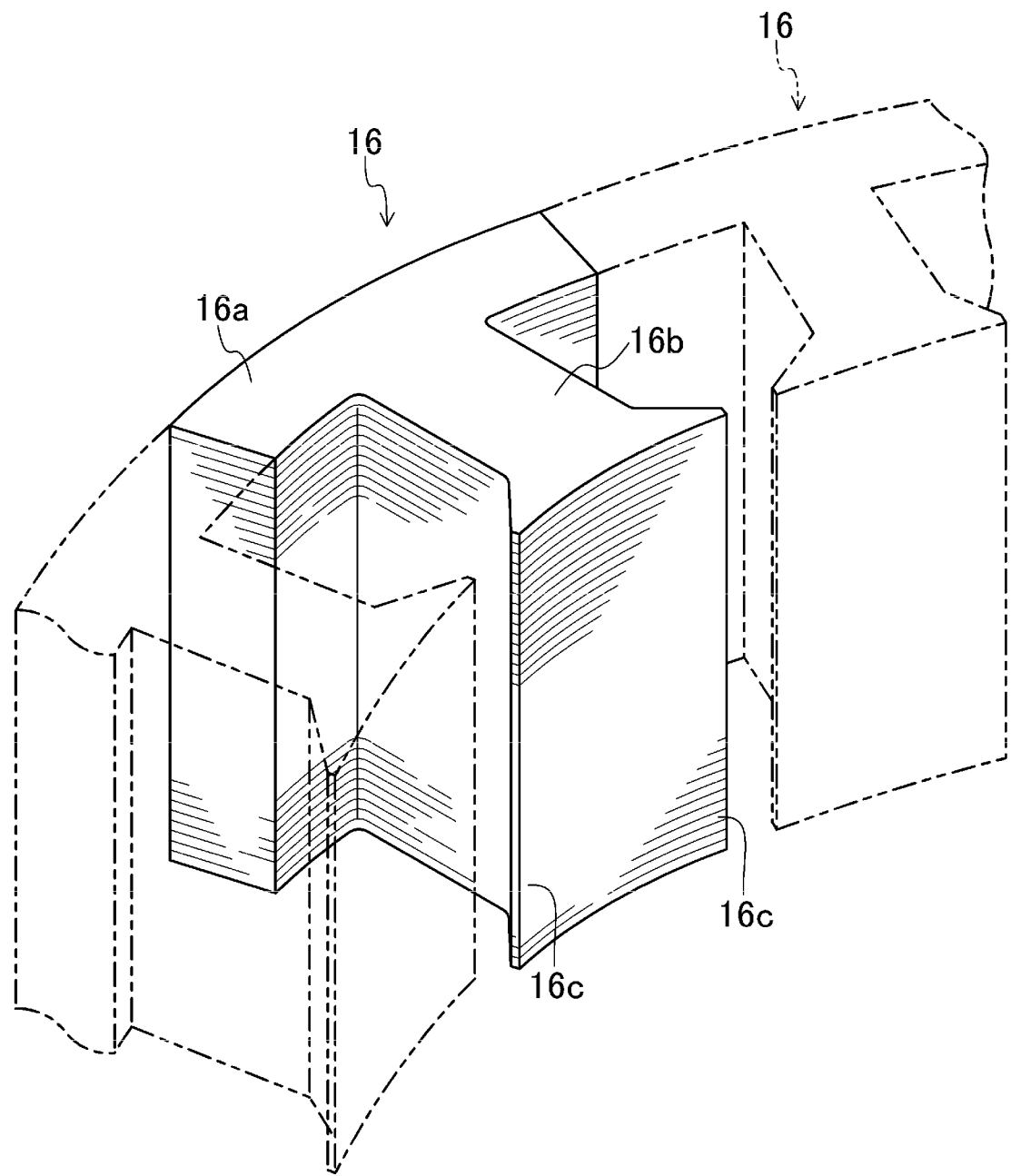
FIG. 2 is a perspective view showing an outline of split cores according to a preferred embodiment of the present invention.

As shown in FIG. 2, the split cores 16 are preferably defined by laminating a plurality of steel plates which has a substantially T-shape in the axial direction. Specifically, the split cores 16 preferably include core back portions 16a having a substantially arc-shaped cross-section, and tooth portions 16b which are extended from approximate center portions in the circumferential directions of the core back portions 16a to the inside in the radial direction and have a substantially rectangular cross-section. A pair of tooth protrusions 16c and 16c which respectively protrude toward both sides in the circumferential direction is disposed in the tip portion of the tooth portion 16b. By fitting ends in the circumferential direction sides of the core back portions 16a to each other, the split cores 16 are connected in a cylindrical shape.

Figure 3:
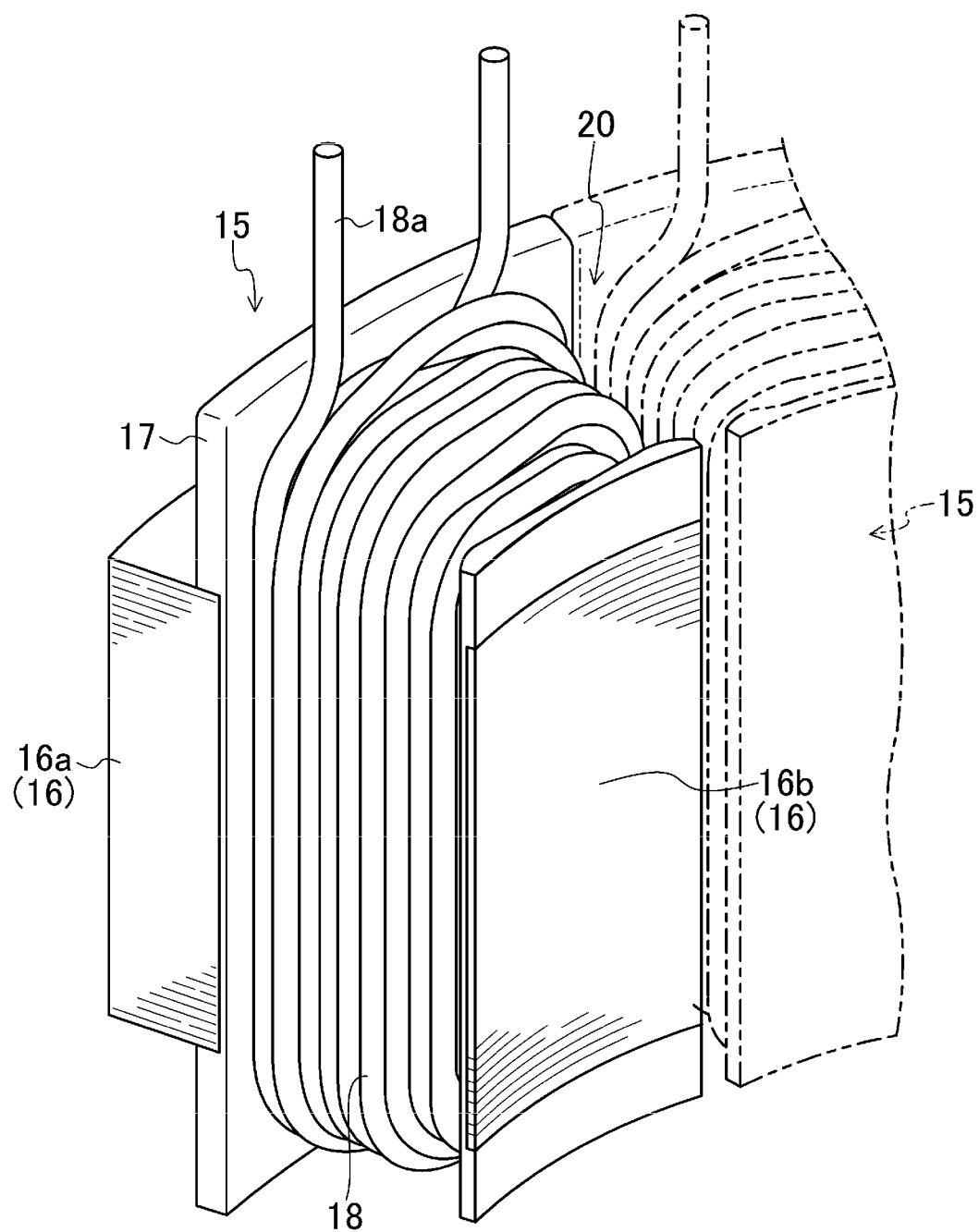
FIG. 3 is a perspective view showing an outline of a split stator according to a preferred embodiment of the present invention.

As shown in FIG. 3, in the split stators 15, a coil 18 is provided for each split core 16 via the insulator 17 which is preferably made of, for example, a synthetic resin.

The coil 18 is preferably defined by winding the conducting wire 18a such as, for example, an enamel coated copper wire around the tooth portions 16b on which the insulators 17 are mounted. The end of the winding start side and the end of the winding end side of the conducting wire 18a are preferably electrically connected to an outside device via, for example, a bus bar unit, plugs, or the like (all are not shown) respectively. By supplying a controlled current to each coil 18 through the plugs or the like, the motor is rotated at a predetermined output.

A slot 20 in which the conducting wire 18a of the coil 18 is accommodated is defined between two split stators 15 which are connected to each other. The proportion of the slot 20 which is occupied by the cross-section of the conducting wire 18a with respect to the total area of the slot 20 is referred to as a space factor. An improvement of the space factor is important for improving the motor performance.

In general, in order to improve the space factor, decreasing the thickness of the insulator is an effective measure. If the thickness of the insulator is decreased, the holding capacity of the conducting wire is also increased to that extent because the volume of the slot is increased.

However, as the thickness of the insulator is decreased, not only is a strength of the insulator decreased, but also various harmful effects occur. For example, as the thickness of the insulator is decreased, the shape of the insulator cannot reliably be held stable. Therefore, the insulator is easily subjected to the influence of thermal shrinkage at the time of molding, and deformations such as bending, for example, also occur. As a result, a mounting operation of the insulators to the split cores becomes difficult, and workability is decreased.

With respect to the deformation of the insulator, in the insulator 17 of a present preferred embodiment, strength can be secured and mounting of the insulator 17 to the split core 16 can be easily performed even in the case where the thickness of the insulator 17 is decreased.

Figure 4:
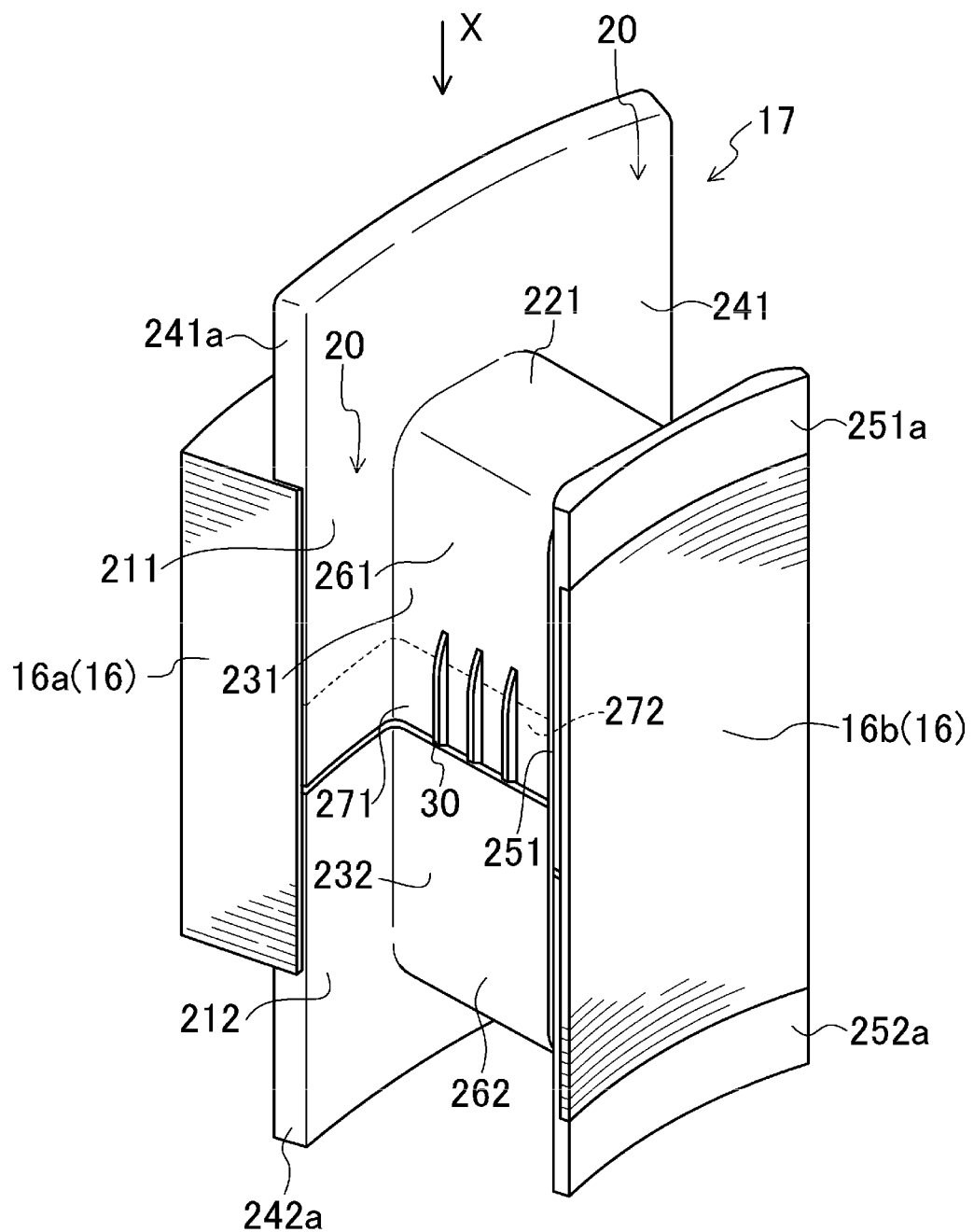
FIG. 4 is a perspective view showing an outline of a split core according to a preferred embodiment of the present invention on which an insulator is mounted.
Figure 5A:
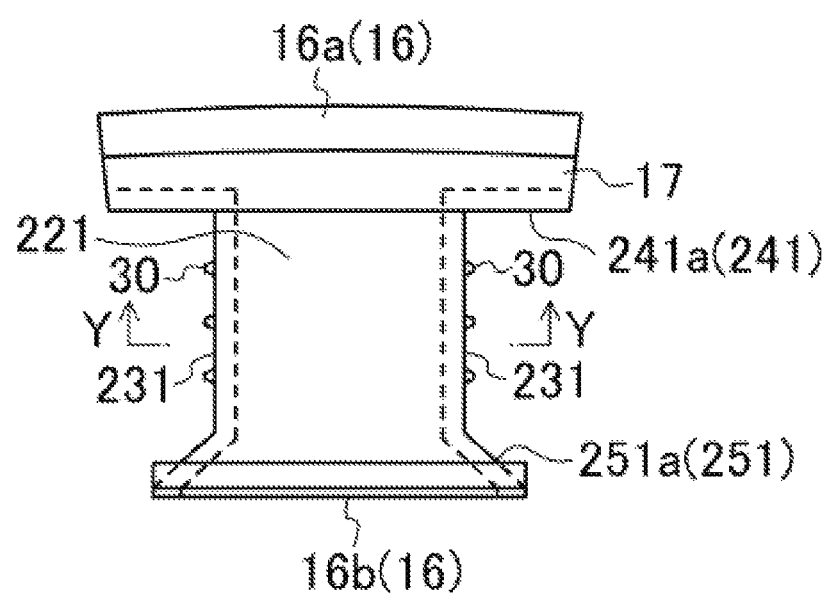
FIG. 5A is a schematic plane view when viewing from an arrow X direction of FIG. 4.
Figure 5B:
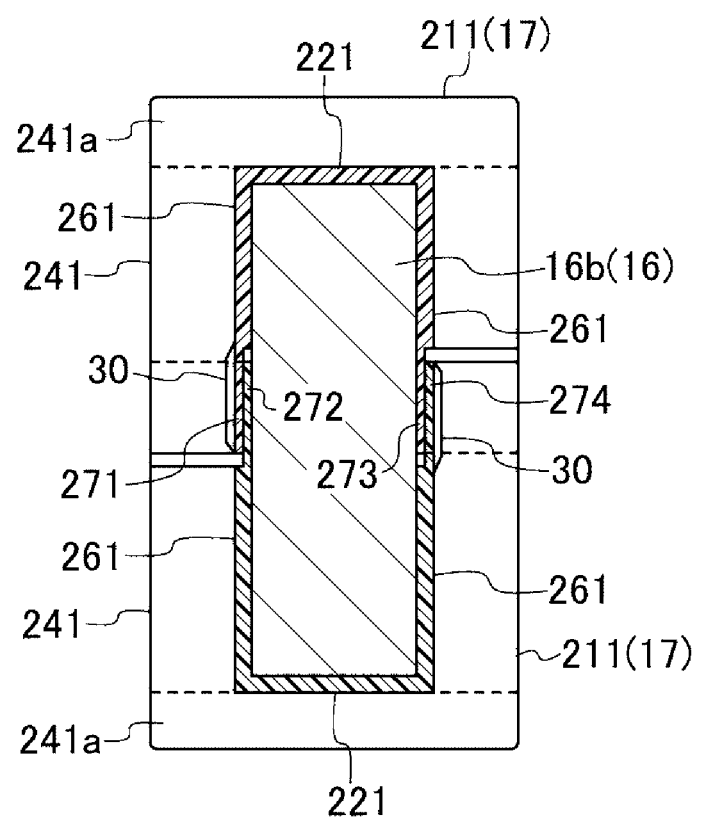
FIG. 5B is a schematic cross-sectional view taken along a Y-Y line of FIG. 5A.

The insulator 17 of the present preferred embodiment is shown in FIGS. 4, 5A, and 5B. The insulator 17 is preferably formed through, for example, an injection molding of a molten resin. As material of the insulator 17, for example, polyester-based resins such as PBT (polybutylene terephthalate) or nylon-based resins can preferably be used. Among these, the nylon-based resins are most preferred, for example. The nylon-based resins are suitable so as to mold the insulator 17 having a thin thickness.

The insulator 17 preferably includes a first member 211 and a second member 212. By abutting the first member 211 and the second member 212 to each other in the axial direction and mounting on the split core 16, both are overlapped. The shapes of the first member 211 and the second member 212 of the present preferred embodiment are constituted so as to be substantially the same as each other.

The first member 211 preferably includes a first end wall 221 having a rectangular or substantially rectangular plate shape, a pair of first side walls 231 and 231 having a rectangular or substantially rectangular shape, a first outside flange portion 241, and a first inside flange portion 251. The first end wall 221 covers an upper side end in the axial direction of the winding portion in which the conducting wire is wound around the tooth portion 16b. The first side walls 231 and 231 are extended so as to face each other in the circumferential direction from both side edges of the circumferential direction side of the first end wall 221, and cover both side portions of the winding portion. The first outside flange portion 241 protrudes from the edge of the outside in the radial direction of the first end wall 221 and the first side walls 231 and 231, and extended in the axial direction and the circumferential direction. The first inside flange portion 251 protrudes from the edge of the inside in the radial direction of the first end wall 221 and the first side walls 231 and 231, and extended in the axial direction and the circumferential direction. Moreover, similarly, the second member 212 also preferably includes a second end wall (not shown), a pair of second side walls 232 and 232, a second outside flange portion (not shown), and a second inside flange portion (not shown). In addition, hereinafter, the second member 212 is explained only when the configurations of the first member 211 and the second member 212 are different from each other, and the explanation of the second member is omitted with respect to the same portions in the configurations of the first member 211 and the second member 212.

The first outside flange portion 241 preferably includes a first outside regulating wall 241a which protrudes from the end of the axial direction side in the split core 16. Similarly, the first inside flange portion 251 also includes a first inside regulating wall 251a which protrudes from the end of the axial direction side in the split core 16. Moreover, similarly, the second member 212 also includes a second outside regulating wall 242a and a second inside regulating wall 252a.

The ends of the axial direction side of the portion around which winding wires of the tooth portion 16b are wound are covered by the first end wall 221 or the second end wall 222, and both side portions of the tooth portion 16b are covered by the first side walls 231 and 231 and both second side walls 232 and 232. The portion which faces the slot 20 of the core back portion 16a is preferably covered by the first outside flange portion 241 and the second outside flange portion 242, and the portion which faces the slot 20 of the tooth protrusion 16c is covered by the first inside flange portion 251 and the second inside flange portion 252.

Among the first end wall 221, the first side walls 231 and 231, the first outside flange portion 241, and the first inside flange portion 251, particularly, the thicknesses (thicknesses of the plates) of the first side walls 231 and 231, the first outside flange portion 241, and the first inside flange portion 251 are constituted so as to be thin.

However, the thicknesses of the first outside regulating wall 241a and the first inside regulating wall 251a are preferably thicker than the thicknesses of other portions of the first outside flange portion 241 and the first inside flange portion 251. Specifically, the surface of the slot 20 side of the first outside regulating wall 241a is preferably continued without steps (i.e., is flush or substantially flush) with respect to the surfaces of the other portions of the first outside flange portion 241. However, the surface of the other side of the first outside regulating wall 241a is protruded farther to the outside in the radial direction than the other side surface of the other portions of the first outside flange portion 241. As a result, the thickness of the first outside regulating wall 241a becomes thicker than the thicknesses of the other portions of the first outside flange portion 241. Similarly, the surface of the slot 20 side of the first inside regulating wall 251a is preferably continued without steps with respect to the surfaces of the other portions of the first inside flange portion 251. However, the surface of the other side of the first inside regulating wall 251a protrudes farther to the inside in the radial direction than the other side surface of the other portions of the first inside flange portion 241. As a result, the thickness of the first inside regulating wall 251a preferably becomes thicker than the thicknesses of the other portions of the first inside flange portion 251. Due to the configuration of the first outside regulating wall 241a or the first inside regulating wall 251a, the conducting wire 18a which is wound around the tooth portion 16b through the insulator 17 is more firmly held to the tooth portion. In addition, the portion which protrudes farther in the first outside regulating wall 241a or the first inside regulating wall 251a can contact the end in the axial direction of the core back portion 16a or the tooth protrusion 16c. Therefore, the first member 211 can be mounted on the tooth with high accuracy.

The pair of first side walls 231 and 231 preferably includes a pair of first abdominal portions 261 and 261, a first overlap portion 271, and a third overlap portion 273 (refer to FIG. 5B). The first abdominal portion 261 extends to the first end wall 221. In addition, among the pair of first side walls 231 and 231, one preferably includes the first overlap portion 271 and the other preferably includes the third overlap portion 273. The first overlap portion 271 and the third overlap portion 273 are positioned lower than the first abdominal portion 261. Moreover, the thicknesses in the thickness directions of the first overlap portion 271 and the third overlap portion 273 are thinner than the thickness in the thickness direction of the first abdominal portion 261.

In addition, the pair of second side walls 232 and 232 preferably include second abdominal portions 262, a second overlap portion 272, and a fourth overlap portion 274. Moreover, when the first member 211 and the second member 212 are combined with each other, the first overlap portion 271 and the second overlap portion 272 are vertically overlapped in the thickness directions. In other words, the first overlap portion 271 and the second overlap portion 272 are overlapped in the circumferential direction. In addition, the third overlap portion 273 and the fourth overlap portion 274 are also similarly vertically overlapped in the thickness directions. In other words, the third overlap portion 273 and the fourth overlap portion 274 are overlapped in the circumferential direction. As a result, even though the first member 211 and the second member 212 are combined with slight deviation in the axial direction, since the first member 211 and the second member 212 are overlapped, the tooth portion 16b and the conducting wire 18a is insulated from each other with high accuracy.

In the present preferred embodiment, when the first member 211 and the second member 212 are combined with each other, the first overlap portion 271 is positioned at the upper side in the thickness direction with respect to the second overlap portion 272. Moreover, when the first member 211 and the second member 212 are combined with each other, the fourth overlap portion 274 is positioned at the upper side in the thickness direction with respect to the third overlap portion 273. According to the configuration, the shape of the first member preferably is the same or substantially the same as that of the second member, and the first member and the second member can preferably be manufactured by the same mold.

In the insulator 17 of the present preferred embodiment, even though the first member 211 and the second member 212 are combined, the thickness corresponding to the combined thicknesses of the first overlap portion 271 and the second overlap portion 272 becomes substantially the same as the thicknesses of other portions of the first side wall 231 or the second side wall 232 so that the thickness at approximately the entire region of the first side wall 231 or the second side wall 232 is uniform. The thickness which adds the thickness of the third overlap portion 273 and the thickness of the fourth overlap portion 274 also becomes similar to the above-described case.

Specifically, the outer surface 271a (refer to FIG. 6) of the first overlap portion 271 which is disposed at the first side wall 231 of the one side of the first member 211 is preferably continued to the outer surface of the first abdominal portion 261, which is disposed at the first side wall 231 of the one side of the first member 211, without steps. In addition, the inner surface of the third overlap portion 273 which is disposed at the first side wall 231 of the other one side of the first member 211 is preferably continued to the inner surface of the first abdominal portion 261, which is disposed at the first side wall 231 of the other one side of the first member 211, without steps (refer to FIG. 6). Moreover, the inner surface 272b of the second overlap portion 272 which is disposed at the second side wall 232 of the one side of the second member 212 is preferably continued to the inner surface of the second abdominal portion 262, which is disposed at the first side wall 231 of the one side of the first member 212, without steps. In addition, the outer surface of the fourth overlap portion 274 which is disposed at the second side wall 232 of the other one side of the second member 212 is preferably continued to the outer surface of the second abdominal portion 262, which is disposed at the first side wall 231 of the other one side of the second member 212, without steps.

Further, when the first member 211 and the second member 212 are combined with each other, the outer surface 271a of the first overlap portion 271 is preferably flush or substantially flush with the outer surface of the second abdominal portion 262 which extends to the second overlap portion 272. There is a gap between the outer surface 271a of the first overlap portion 271 and the outer surface of the second abdominal portion 262 which extends to the second overlap portion 272. In addition, the inner surface 272b of the second overlap portion 272 is preferably flush or substantially flush with the inner surface of the first abdominal portion 261 which extends to the first overlap portion 271. There is a gap between the inner surface 272b of the second overlap portion 272 and the inner surface of the first abdominal portion 261 which extends to the first overlap portion 271. That is, the first overlap portion 271 and the second overlap portion 272 have portions which are not overlapped with each other. As a result, when the first member 211 and the second member 212 are combined with each other, the occurrence of a gap, which is generated due to the fact that the tip of the first overlap portion 271 contacts the end of the second abdominal portion 262, or the like, between the end in the axial direction of the tooth portion 16b and the inner surface of the first end wall 221 or the inner surface of the second end wall 222 can be prevented.

A plurality of ribs 30 (preferably three in the present preferred embodiment) is disposed at intervals in the radial direction in the outer surface 271a of the first overlap portion 271. The ribs 30 preferably protrude from the first side wall 231, and extend from the lower side toward the upper side in the axial direction of the first overlap portion 271. Ends of the ribs 30 are preferably positioned at the tip of the first overlap portion 271, and other ends of the ribs 30 are preferably positioned at the first abdominal portion 261. According to this configuration, the first overlap portion 271 obtains greater strength, as compared to a case where the ribs 30 are disposed on only the first overlap portion 271. Moreover, similarly to the case of the first overlap portion 271, the ribs 30 are also preferably provided on the fourth overlap portion 274.

By the disposing the ribs 30 in this way, a strength against deformations, such as, for example, bending of the first overlap portion 271 and the fourth overlap portion 274, is improved. Moreover, since the first overlap portion 271 and the fourth overlap portion 274 are supported by the ribs 30, for example, deformations such as deflection, corrugation, and bending can preferably be suppressed. Accordingly, even though the thicknesses of the first overlap portion 271 and the fourth overlap portion 274 become thin, the shape of the first overlap portion 271 or the fourth overlap portion 274 is stably held, compared to the case where the ribs 30 are not provided.

Figure 6:
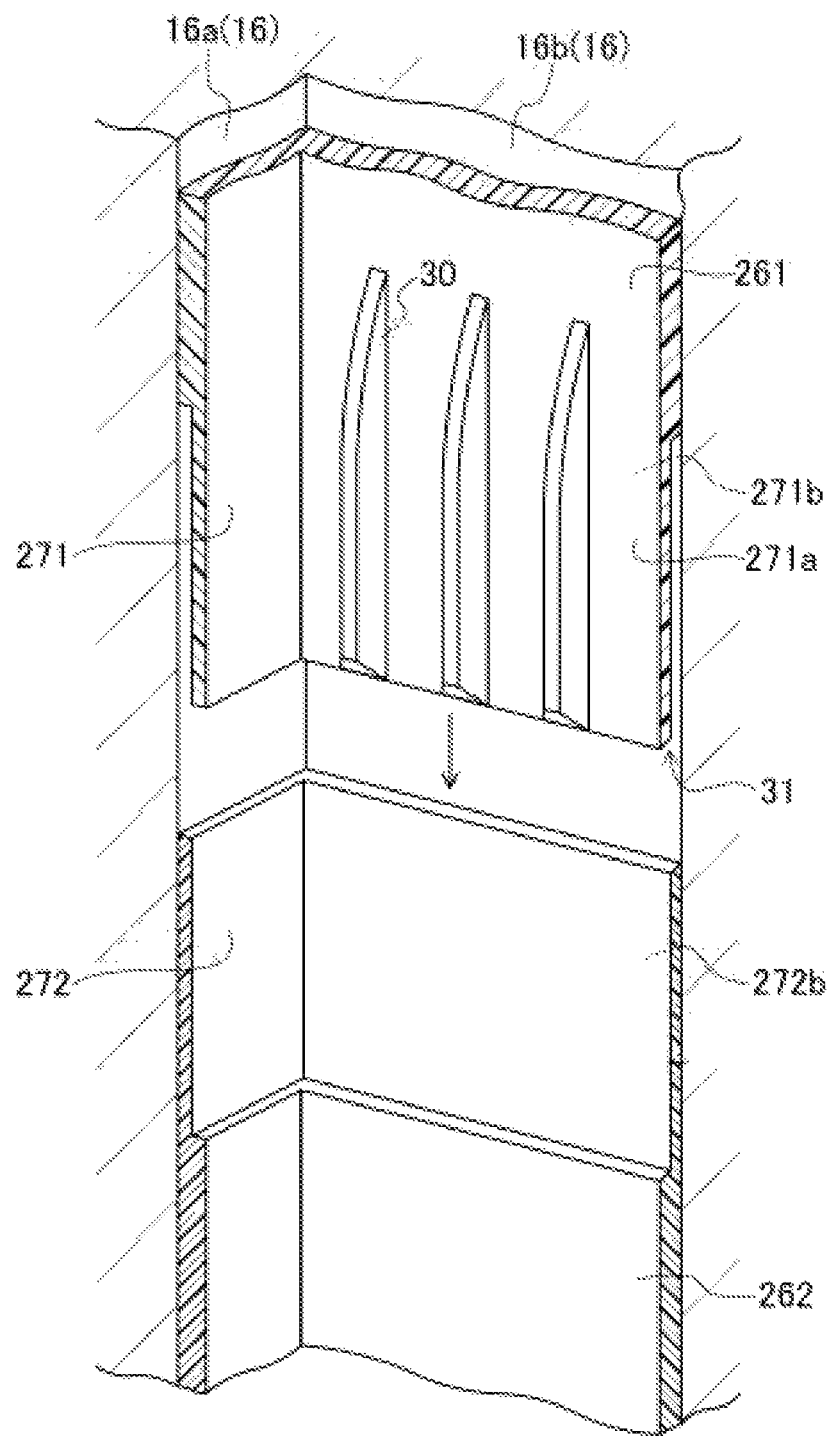
FIG. 6 is an explanatory view when the insulator is mounted on the split core according to a preferred embodiment of the present invention.

For example, as shown in FIG. 6, when the second member is mounted on the split core after the first member is mounted on the split core, it is necessary to insert the second overlap portion of the second member to a slight gap (also referred to as an "insertion gap") between the first overlap portion of the first member and the split core. If the first overlap portion is bent to the tooth portion side, the second overlap portion contacts the first overlap portion when the second overlap portion of the second member is inserted to the insertion gap 31, and there are concerns that damage may be generated and the insertion may be difficult.

In contrast, because the shape of the first overlap portion 271 is stably held by disposing the ribs 30 on the first overlap portion 271 in the case of the first member 211 of the present preferred embodiment, the second overlap portion 272 can be easily inserted to the insertion gap 31.

Figure 7:
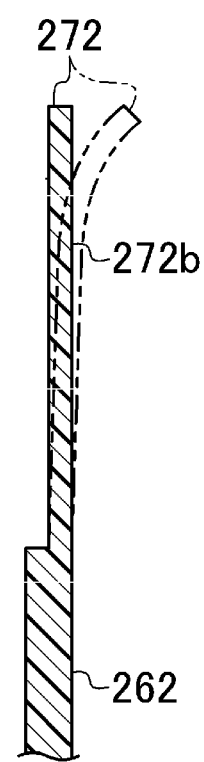
FIG. 7 is a schematic cross-sectional view showing a main portion of the insulator according to a preferred embodiment of the present invention.

As shown in a dashed line in FIG. 7, if the second overlap portion 272 is thin, there is a concern that the tip of the second overlap portion 272 will be bent to the inner surface 272b side due to effect of the shrinkage which is generated at the time of molding of the second member 212. However, even though the tip of the second overlap portion 272 is bent to the inner surface 272b side, the bent tip of the second overlap portion 272 is pressed to the split core 16 side when being mounted on the split core 16. As a result, even though the tip of the second overlap portion 272 is bent, the tip does not contact the first overlap portion 271 and can be relatively easily inserted to the insertion gap 31.

In addition, a size of the opening between both first side walls 231 and 231 becomes greater than the size between both side portions of the tooth portion 16b by the size of the insertion gap 31. As a result, when the first member 211 is mounted on the split core 16, even though the tip of the third overlap portion 273 is slightly deformed, the first member 211 can be easily mounted on the split core 16 by using the size difference of the size of the opening between both first side walls 231 and 231 and the size between both side portions of the tooth portion 16b.

The thickness of the first overlap portion 271 may be the same or substantially the same as that of the second overlap portion 272. However, the thickness of the first overlap portion 271 may be thinner than that of the second overlap portion 272 because the ribs 30 are disposed on the first overlap portion 271.

Second Preferred Embodiment

Figure 8:
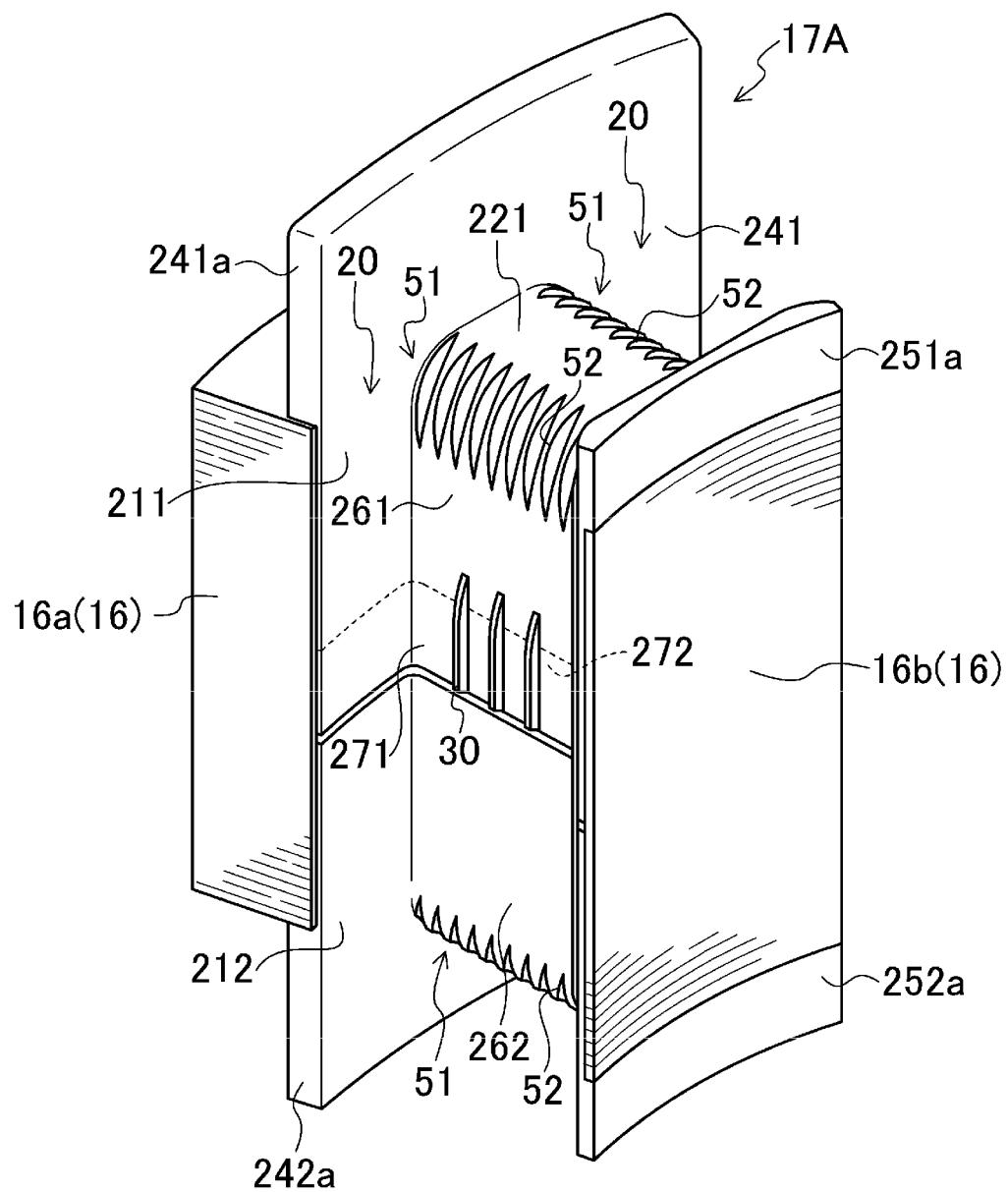
FIG. 8 is a perspective view showing an outline of a split core on which an insulator is mounted in a second preferred embodiment of the present invention.

FIG. 8 shows the insulator 17 (referred to as an "insulator 17A") of a second preferred embodiment of the present invention. Moreover, since the basic configurations are similar to those of the first preferred embodiment, the similar configurations are denoted with the same reference numbers and explanations thereof are omitted.

The insulator 17A preferably further improves the space factor. Specifically, a plurality of guide ribs 52 is preferably disposed on each of both corners 51 and 51 of the first member 211 to which the first end wall 221 and the first side walls 231 are extended. The guide ribs 52 have a cross-sectional shape which spreads out from the tip side toward the base end side in the first member 211. Moreover, the guide ribs 52 are preferably disposed at the same or substantially the same interval as the interval in which the conducting wire is arranged in the radial direction over the entire region in radial direction of the corner 51. Since the portions between the guide ribs 52 are relatively concave with respect to the guide ribs 52, arc-shaped guide grooves are defined. In addition, similarly, the guide ribs 52 are also disposed with respect to the second member 212.

Accordingly, in the case of the spilt core 16 on which the insulator 17A is mounted, when the conducting wire 18a is wound around the corners 51, regular winding is stably achieved because the conducting wire 18a is guided according to the guide ribs 52. As a result, the present preferred embodiment can improve the space factor. At this time, since the ribs 30 extend so as to be parallel or substantially parallel to the direction in which the conducting wire 18a is wound around, regular winding is not disturbed. In addition, if the guide ribs 52 are disposed on the extended lines of the ribs 30, regular winding can be performed with higher accuracy. As a result, the present preferred embodiment can further improve the space factor.

Third Preferred Embodiment

Figure 9:
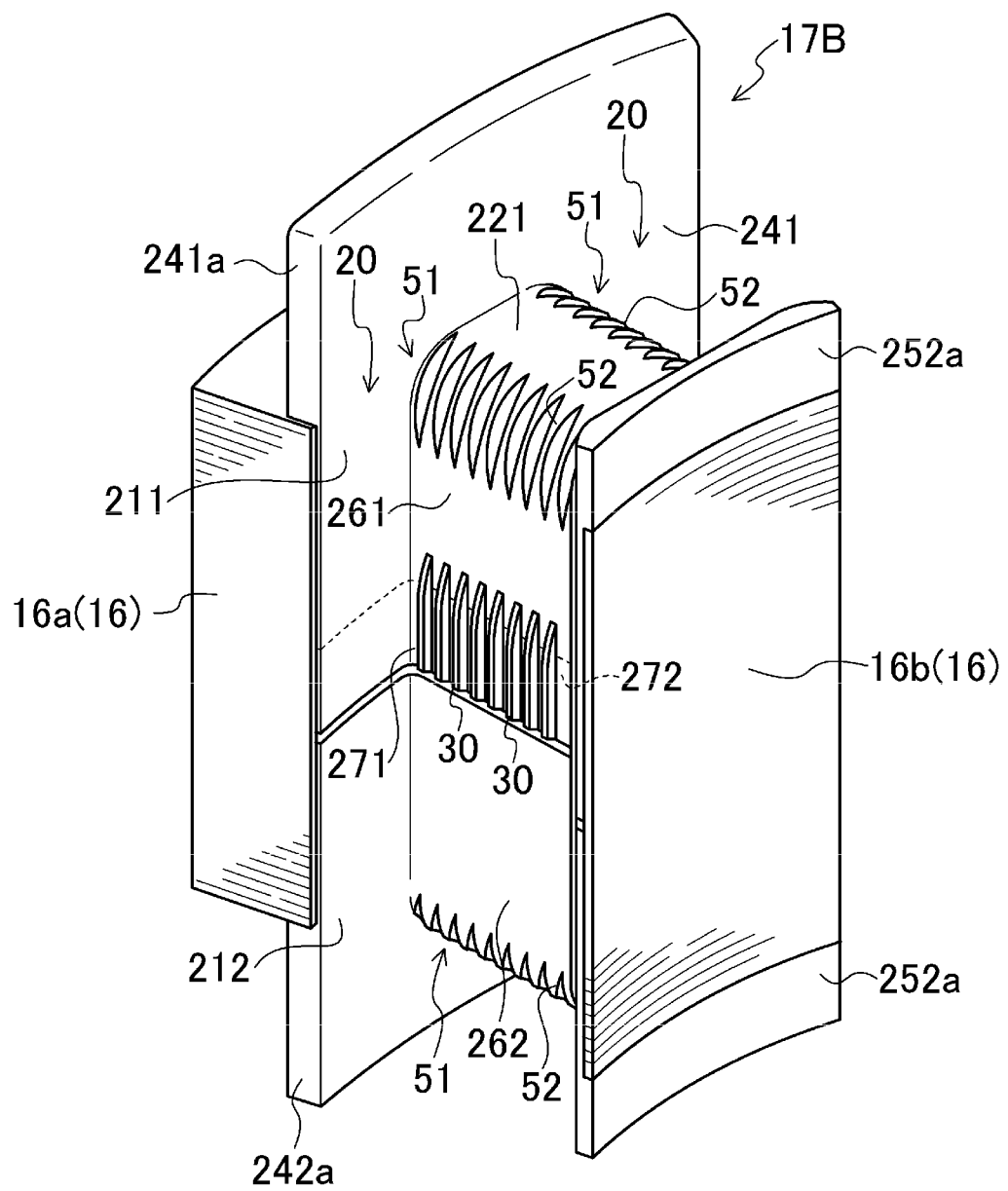
FIG. 9 is a perspective view showing an outline of a split core on which an insulator is mounted in a third preferred embodiment of the present invention.

FIG. 9 shows the insulator 17 (referred to as an "insulator 17B") of a third preferred embodiment of the present invention. Moreover, since the basic configurations are similar to those of the second preferred embodiment or the like, the similar configurations are denoted with the same reference numbers and explanations thereof are omitted.

The insulator 17B is preferably arranged to further improve the space factor. Specifically, ribs 30 are disposed at the same or substantially the same interval as the interval in which the conducting wire 18a is arranged in the radial direction over the approximately entire region in radial direction of the first overlap portion 271 (first side wall 231). In addition, the disposition of the ribs 30 corresponds to the disposition of the guide ribs 52. That is, the guide ribs 52 are preferably disposed on the extended lines of the ribs 30.

Figure 10:
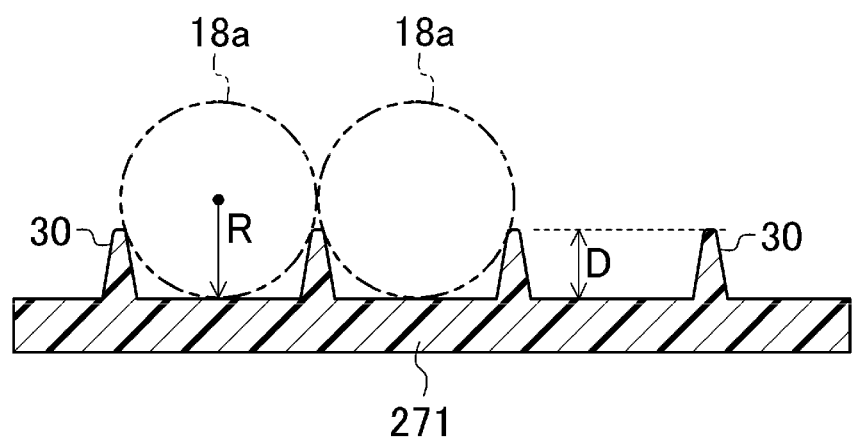
FIG. 10 is a schematic cross-sectional view showing the main portion of the insulator in the third preferred embodiment of the present invention.

Specifically, as shown in FIG. 10, similarly to the guide ribs 52, a height D of the rib 30 from the outer surface 271a of the first overlap portion 271 (or the first side wall 231) is defined so as to be smaller than a radius R of the conducting wire 18a. In addition, the conducting wire 18a is received between the ribs 30. Moreover, each conducting wire 18a is supported by the ribs 30 so that portions of the conducting wire 18a which are adjacent to each other is arranged without or substantially without gaps. That is, the ribs 30 of the present preferred embodiment acts also as the guide rib 52.

Accordingly, in the case of the split core 16 on which the insulator 17B is mounted, when the conducting wire 18a is wound around, the conducting wire 18a is guided not only by the guide ribs 52 in the corner 51 of the insulator 17B but also by the ribs 30 at the intermediate portion of the circumferential direction side of the insulator 17B. Therefore, regular winding is further stably achieved. Therefore, the space factor is further improved.

Fourth Preferred Embodiment

Figure 11:
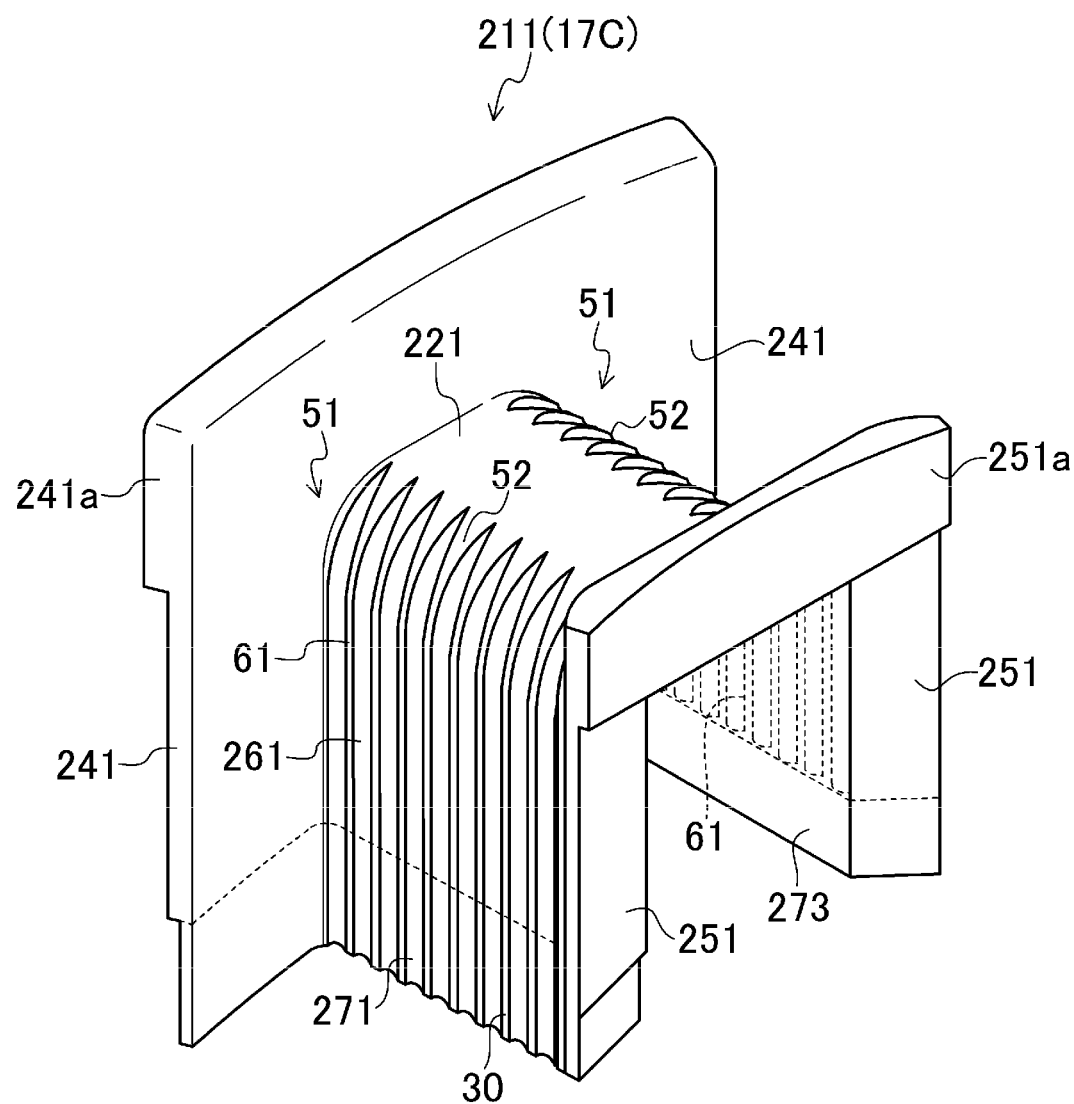
FIG. 11 is a perspective view showing an outline of a first member of a fourth preferred embodiment of the present invention.
Figure 12:
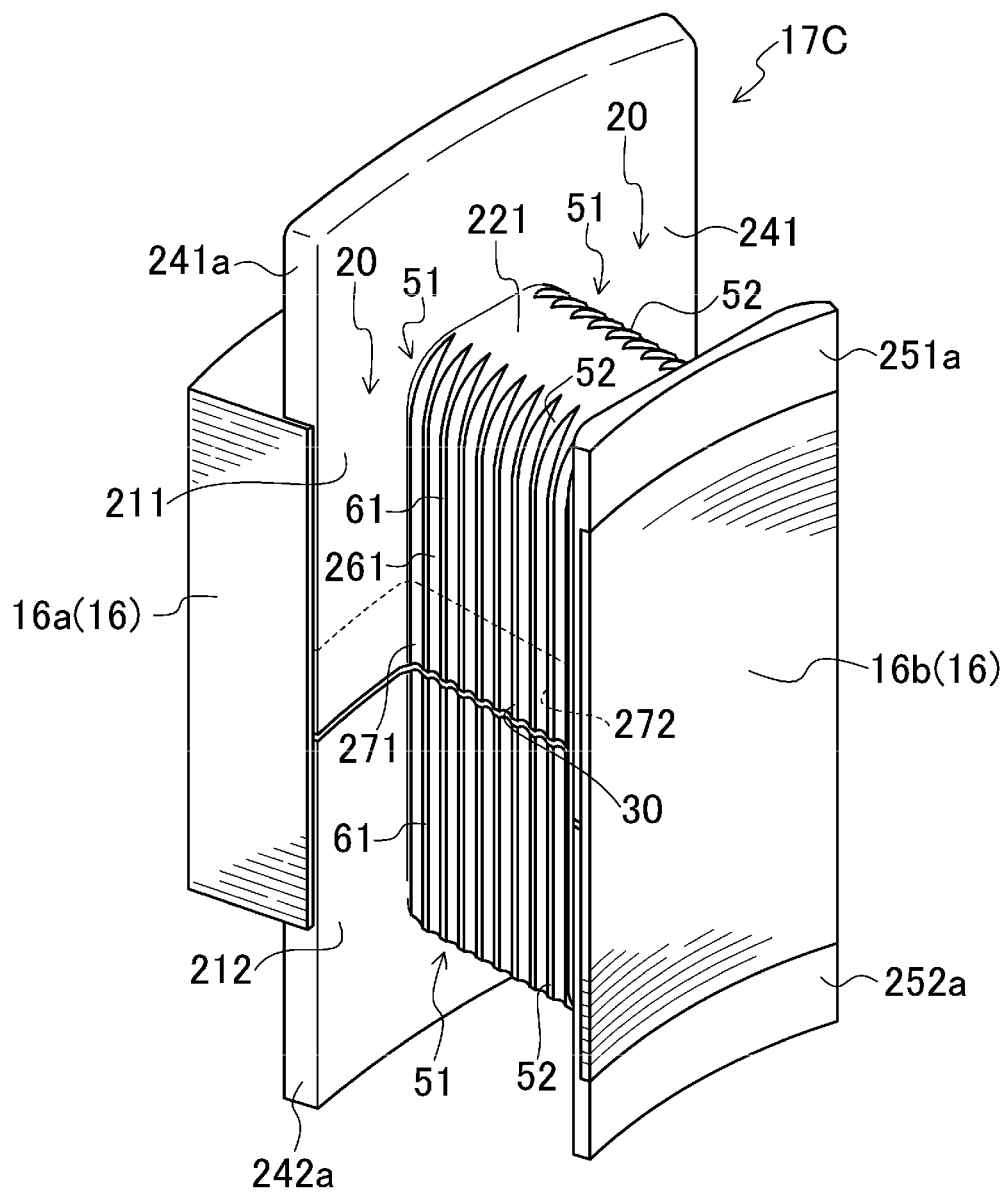
FIG. 12 is a perspective view showing an outline of a split core on which an insulator is mounted in a fourth preferred embodiment of the present invention.

FIGS. 11 and 12 show the insulator 17 (referred to as an "insulator 17C") of a fourth preferred embodiment of the present invention. Moreover, since the basic configurations are similar to those of the third preferred embodiment, the similar configurations are denoted with the same reference numbers and explanations thereof are omitted.

In the insulator 17C, connection ribs 61 are preferably disposed between the ribs 30 and the guide ribs 52 so as to be extended to both. In addition, the ribs 30 and the connection ribs 61 have the same cross-sectional shape as each other. Therefore, the ribs 30, the guide ribs 52, and the connection ribs 61 are defined to be connected and integrated as a single monolithic member.

Specifically, similarly to the shape of the guide ribs 52, the ribs 30 or the connection ribs 61 have a cross-sectional shape which spreads out from the tip side toward the base end side in the ribs 30 or the connection ribs 61 and are protruded from the first side wall 231. Moreover, the ribs are arranged so as to be extended from the corner 51 to which the first side wall 231 including the first overlap portion 271 and the first end wall 221 are extended, to the tip of the first overlap portion 271. The portions between ribs which are adjacent in the radial direction in each of the ribs 30, the connection ribs 61 and the guide ribs 52 are concave with respect to each rib, and therefore, arc-shaped guide grooves are provided.

In addition, the guide ribs 52 and the connection ribs 61 are also provided on the second side wall 232 in which the second overlap portion 272 is provided. Specifically, the ribs are arranged so as to extend from the corner 51 to which the second side wall 232 including the second overlap portion 272 and the second end wall 222 extend to the base end of the second overlap portion 272.

Accordingly, when the first member 211 and the second member 212 are mounted on the split core 16, the ribs 30 of the first member 211 are disposed on the second member 212 and are preferably collinear with the connection ribs 61. As a result, the ribs and the guide grooves are provided over the entire or substantially the entire region of both first side walls 231 and 231 and both second side walls 232 and 232 of the insulator 17.

Accordingly, in the case of the spilt core 16 on which the insulator 17C is mounted, when the conducting wire 18a is wound, since the conducting wire 18a is guided by the guide ribs 52, the ribs 30, or the connection ribs 61 over the entire region of the first side wall 231 and the second side wall 232, regular winding can be further stably achieved. As a result, the space factor is further improved.

In addition, since the ribs 30 or the like preferably have the same shape as each other, there also is an advantage in that the molding is easily performed.

Figure 13:
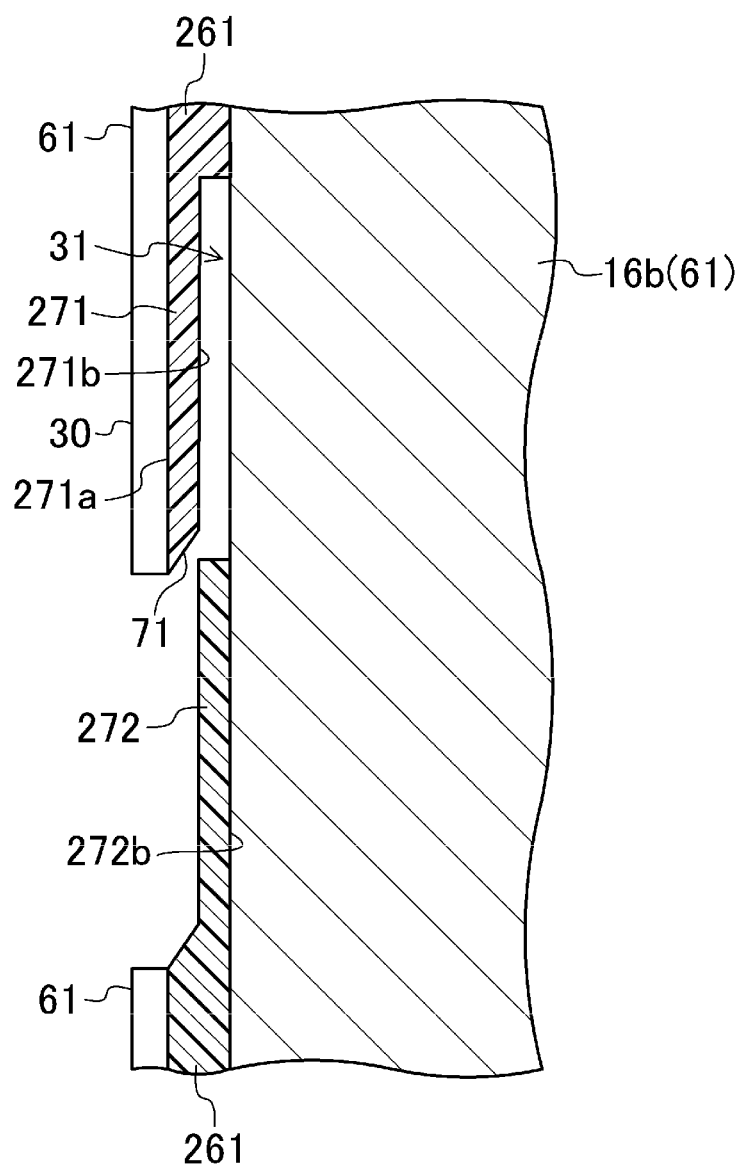
FIG. 13 is a schematic cross-sectional view showing a main portion of an insulator in a modification of a preferred embodiment of the present invention.

FIG. 13 shows a modification of an insulator 17 according to a preferred embodiment of the present invention. In the modification of the insulator 17, unlike the insulators 17 of each of the above-described preferred embodiments, an inclined surface 71 is preferably disposed on the tip of the first overlap portion 271. The inclined surface 71 is preferably continued to the inner surface 271b of the first overlap portion 271 and inclined toward the outer surface 271a side according to going toward the tip of the first overlap portion 271. In addition, FIG. 13 shows the case where the inclined surface is applied to the insulator 17C of the fourth preferred embodiment.

If the inclined surface 71 is preferably disposed on the tip of the first overlap portion 271 in this way, when the first member 211 and the second member 212 are combined, since the tip of the second overlap portion 272 is guided to the insertion gap 31 by the inclined surface 71, the second overlap portion 272 can preferably be easily inserted to the insertion gap 31.

In addition, the insulators and the like according to the preferred embodiments of the present invention are not limited to the above-described preferred embodiments, and include various configurations other than them.

Figure 14:
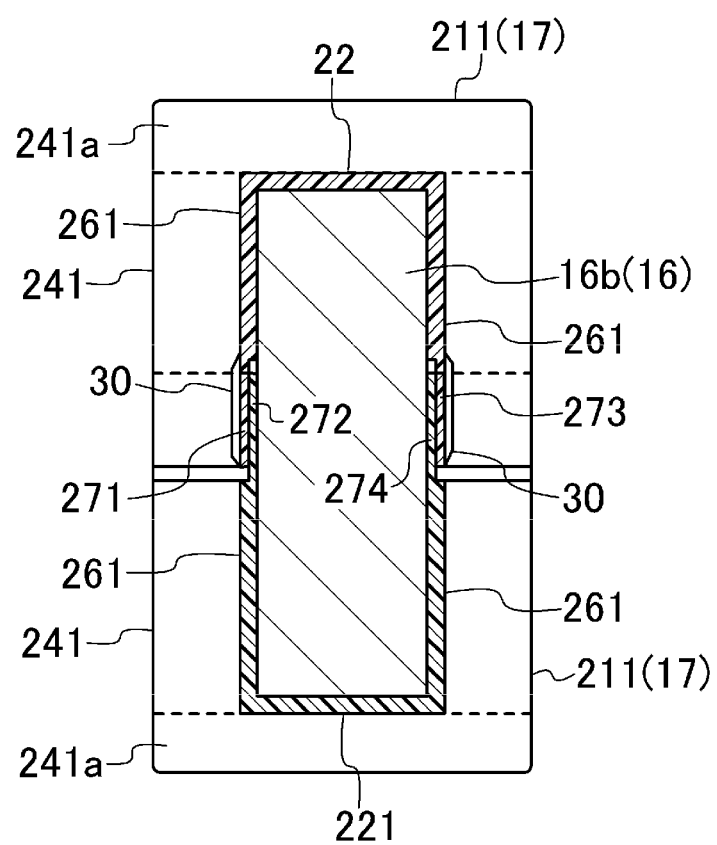
FIG. 14 is a schematic cross-sectional view showing another configuration of overlap portions of the insulator according to a preferred embodiment of the present invention.

For example, the cross-sectional shape of the ribs 30 may be an arc shape, a triangular shape, a trapezoidal shape, or can be arbitrarily provided. In addition, the shapes of the first member 211 and the second member 212 which are combined may not be necessarily the same as each other. For example, the lengths of both first side walls 231 and 231 may not be the same as each other. In addition, when the first member 211 and the second member 212 are combined, the third overlap portion 273 may be positioned in the upper side in the thickness direction with respect to the fourth overlap portion 274. That is, as shown in FIG. 5B, the shape of the first overlap portion 271 may be the same or substantially the same as that of the fourth overlap portion 274, and the shape of the second overlap portion 272 may be the same or substantially the same as that of the third overlap portion 273. In addition, as shown in FIG. 14, the shape of the first overlap portion 271 may be the same or substantially the same as that of the third overlap portion 273, and the shape of the second overlap portion 272 may be the same or substantially the same as that of the fourth overlap portion 274. Moreover, the interval of the ribs which are adjacent may be greater than the diameter of the conducting wire.

The armature of the preferred embodiments of the present invention and modifications thereof can be used in motors which require a high space factor, such as an in-vehicle motor.

While the present invention has been shown and described with respect to the preferred embodiments, the present invention is not limited thereto. It will be understood by those skilled in the art that various changes and modifications may be made without departing from the scope of the present invention as defined in the following claims.

The invention claimed is:

1. An armature comprising:
   a tooth portion;
   an insulator that is mounted on the tooth portion; and
   a conducting wire that is wound around the tooth portion via the insulator; wherein
   the insulator includes a first member and a second member that are combined with each other;
   the first member includes a first end wall that covers an upper side end in an axial direction of a winding portion in which the conducting wire is wound around the tooth portion, and a pair of plate-shaped first side walls that extend from the first end wall to a lower side of the insulator in the axial direction and covers both side portions of the winding portion;
   at least one of the pair of first side walls includes a first abdominal portion that extends to the first end wall, and a first overlap portion that is positioned closer to the lower side than the first abdominal portion and has a thickness which is thinner than a thickness of the first abdominal portion;
   the second member includes a second end wall that covers a lower side end of the winding portion of the tooth portion, and a pair of plate-shaped second side walls that extend from the second end wall to an upper side of the insulator in the axial direction and cover both side portions of the winding portion;
   at least one of the pair of second side walls includes a second abdominal portion that extends to the second end wall, and a second overlap portion that is positioned closer to the upper side than the second abdominal portion and which has a thickness which is thinner than a thickness of the second abdominal portion;
   the first overlap portion is disposed farther from an outer side of the insulator than the second overlap portion in a thickness direction in the at least one of the pair of first side walls in a state where the first member and the second member are combined with each other; and
   a plurality of ribs extending from the lower side to the upper side in an axial direction of the first overlap portion is disposed at an outer surface in the thickness direction of the first overlap portion.

2. The armature according to claim 1, wherein the plurality of ribs is disposed from a tip of the first overlap portion to the first abdominal portion.

3. The armature according to claim 1, wherein the first overlap portion and the second overlap portion include a portion in which at least one of the first overlap portion and the second overlap portion does not overlap the other one in the state in which the first member and the second member are combined with each other.

4. The armature according to claim 2, wherein the first overlap portion and the second overlap portion include a portion in which at least one of the first overlap portion and the second overlap portion do not overlap the other one in the state in which the first member and the second member are combined with each other.

5. The armature according to claim 1, wherein heights of the ribs are lower than a radius of the conducting wire.

6. The armature according to claim 1, wherein at least one of a connection between an outer surface of the first side wall and the outer surface of the first overlap portion or a connection between an inner surface of the second side wall and an inner surface of the second overlap portion is continued without steps.

7. The armature according to claim 1, wherein the ribs are disposed so as to be parallel or substantially parallel to a direction in which the conducting wire is wound.

8. The armature according to claim 1, wherein
   the ribs are disposed on the outer surface of the first overlap portion; and
   an interval between adjacent ones of the ribs is greater than a diameter of the conducting wire.

9. The armature according to claim 1, wherein
   the ribs are disposed on the outer surface of the first overlap portion; and
   the ribs are disposed at the same or substantially the same interval as an interval in which the conducting wire is arranged in a radial direction over an entire region in a radial direction of the first overlap portion.

10. The armature according to claim 9, wherein a cross-sectional shape of a guide groove between the adjacent ribs has an arc shape in a direction which is perpendicular or substantially perpendicular with respect to the axial direction.

11. The armature according to claim 1, wherein
    a plurality of guide ribs is disposed at an extended line of the ribs in at least one of a corner to which the first end wall and the first side wall extend and a corner to which the second end wall and the second side wall extend; and
    an interval between adjacent ones of the guide ribs is greater than the diameter of the conducting wire.

12. The armature according to claim 11, wherein
    a plurality of guide ribs is disposed at an extended line of the ribs in at least one of a corner to which the first end wall and the first side wall extend or a corner to which the second end wall and the second side wall extend; and
    the plurality of guide ribs are disposed at the same or substantially the same interval as an interval in which the conducting wire is arranged in a radial direction over an entire region in the radial direction of at least one of the corner to which the first end wall and the first side wall are extended or the corner to which the second end wall and the second side wall are extended.

13. The armature according to claim 11, wherein the ribs and the guide ribs are connected to each other so as to be continuous.

14. The armature according to claim 1, wherein
another one of the pair of first side walls includes a first abdominal portion that is connected to the first end wall, and a third overlap portion that is positioned closer to the lower side than the first abdominal portion and has a thickness which is thinner than a thickness of the first abdominal portion; and
another one of the pair of second side walls includes a second abdominal portion that is connected to the second end wall, and a fourth overlap portion that is positioned closer to the upper side than the second abdominal portion and has a thickness which is thinner than a thickness of the second abdominal portion.

15. The armature according to claim 12, wherein
a shape of the third overlap portion is the same or substantially the same as that of the first overlap portion; and
a shape of the fourth overlap portion is the same or substantially the same as that of the second overlap portion.

16. The armature according to claim 12, wherein
a shape of the third overlap portion is substantially the same as that of the second overlap portion; and
a shape of the fourth overlap portion is substantially the same as that of the first overlap portion.

17. The armature according to claim 13, wherein a shape of the first member is the same or substantially the same as that of the second member.

18. The armature according to claim 1, wherein the insulator is made of injection molded nylon-based.

19. A motor comprising the armature according to claim 1.

* * * * *